Nov. 7, 1950     A. L. MEYER     2,529,039
DITCH FILLER
Filed Jan. 5, 1948     2 Sheets-Sheet 2
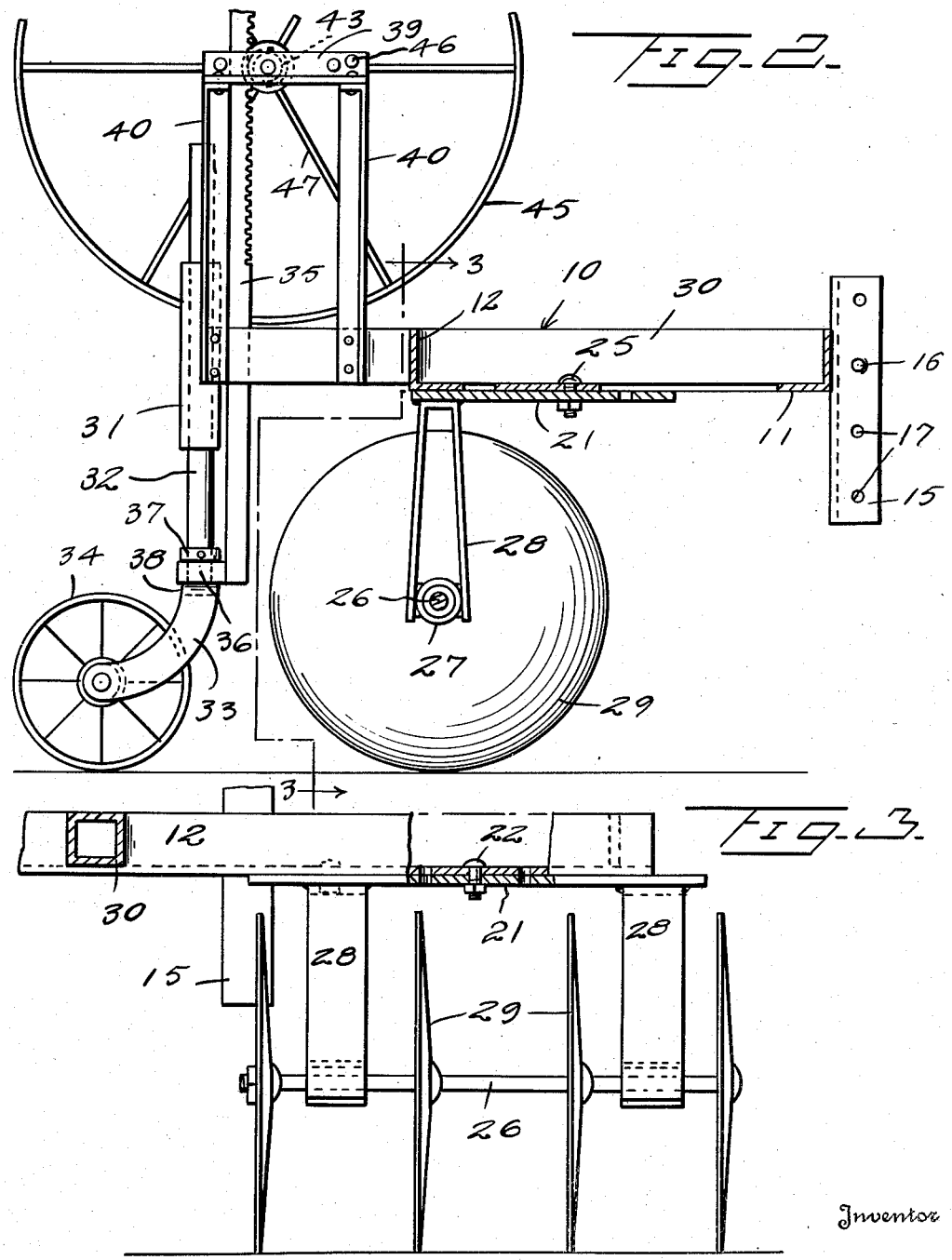
Inventor
A. L. Meyer
By Kimmel & Crowell Attys.

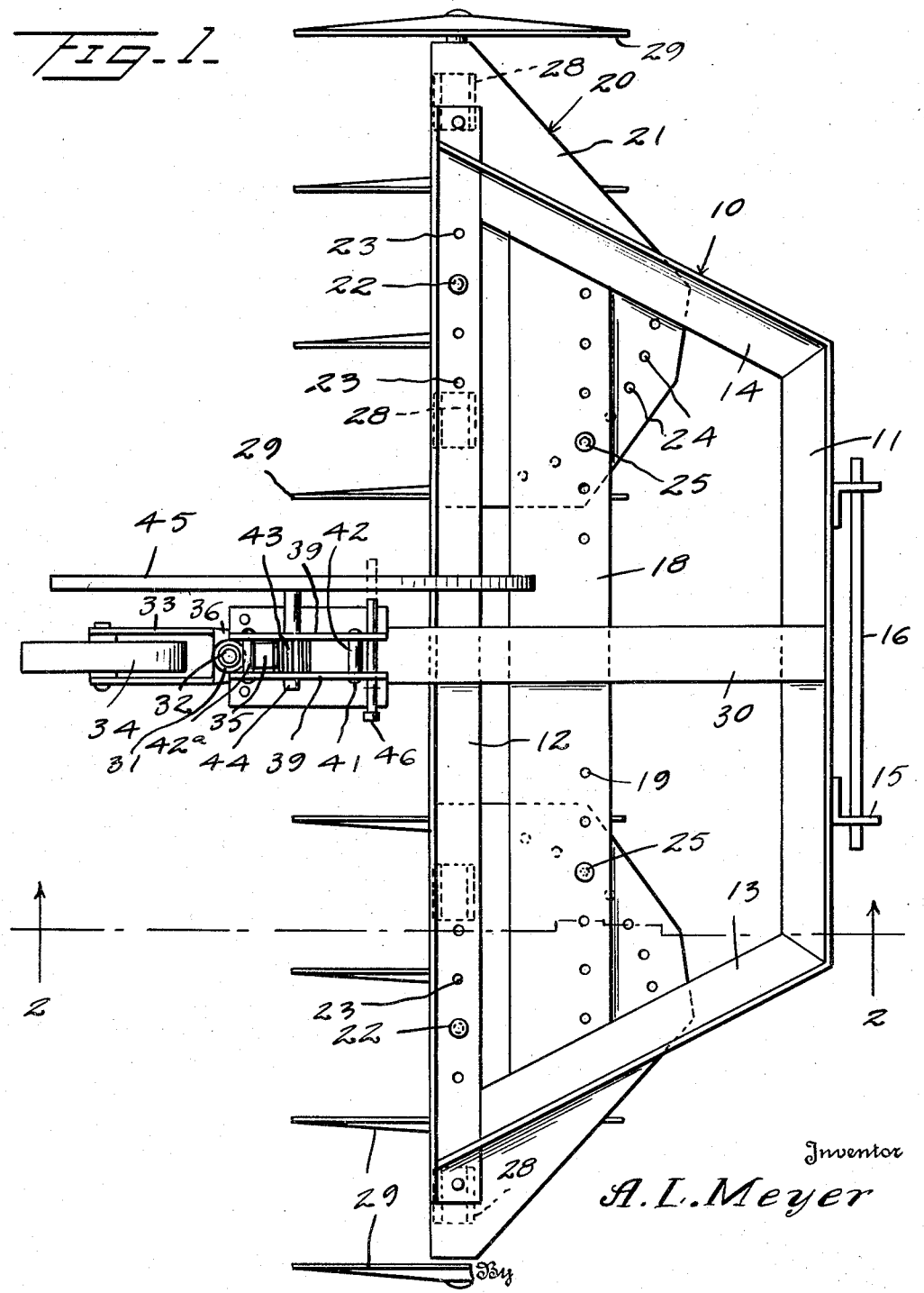

Patented Nov. 7, 1950

2,529,039

UNITED STATES PATENT OFFICE 2,529,039

DITCH FILLER

Alvin L. Meyer, Fairfield, Mont.

Application January 5, 1948, Serial No. 629

1 Claim. (Cl. 55—73)

This invention relates to ditch fillers. An object of this invention is to provide a device for moving earth into ditches, the device including a frame for coupling to the rear of a tractor and provided with two sets of disks which are angularly adjustable with respect to the line of travel, so that the earth can be shifted to the desired degree.

Another object of this invention is to provide in a device of this kind an improved means for raising or lowering the disks while at the same time using a castor wheel at the rear of the frame.

A further object of this invention is to provide and earthworking machine of this kind which includes a pair of disk units mounted on a mobile frame, with the disk units angularly adjustable relative to each other so that the earth may be moved inwardly toward the center of the frame or toward the opposite or outer ends of the frame. The disk units may also be disposed in alignment and at right angles to the line of travel so as to loosen or break up the earth without shifting of the earth.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a plan view of a ditch filler or earthworking machine constructed according to an embodiment of this invention.

Figure 2 is a fragmentary sectional view taken on the line 2—2 of Figure 1.

Figure 3 is a fragmentary sectional view taken on the line 3—3 of Figure 2.

In surface irrigation it is the general practice to run surface ditches, after the crop has been planted, for the purpose of spreading water over the land surface. Just before the crop is to be harvested, it is necessary that the surface ditches be refilled so that the harvesting machines will be provided with a relatively smooth surface upon which to operate.

Referring to the drawings, I have illustrated a ditch filler for this purpose in which the numeral 10 designates generally a frame which is adapted to be coupled to the rear of a tractor. The frame 10 is formed of a front frame bar 11, a rear frame bar 12 and opposite end frame bars 13 and 14. The frame bars 11 to 14 are formed of angle iron having one side thereof horizontal and the other side vertical and the end or outer frame bars 13 and 14 are disposed in forwardly convergent relation. The front or forward frame bar 11 has fixed thereto a pair of vertically disposed angle members 15 which are disposed in spaced relation and a coupling bar 16 is extended through aligned vertically spaced apart openings 17 formed in the angle members 15. The frame 10 also includes a transversely disposed plate 18 which is fixed between the outer end members 13, 14 and is formed adjacent the opposite ends thereof with a plurality of openings 19, the purpose for which will be hereinafter described.

A pair of disk units, generally designated as 20, are disposed beneath the frame 10 at the rear portion thereof and each disk unit includes a plate 21 engaging beneath the frame 10 adjacent the outer end thereof. The plate 21 is pivotally secured to the rear frame bar 12 by means of a pivot bolt 22 engaging through a selected one of a series of spaced openings 23 formed in the rear frame bar 12. The plate 21 is also formed with an arcuate series of openings 24 and a locking bolt 25 engages through a selected one of the openings 19 and a selected one of the openings 24. In this manner the disk units 20 may be angularly adjusted with respect to each other so that these units may be disposed with the disks thereof in either forwardly divergent or forwardly convergent relation or with the disks of one unit disposed in axial alignment with the disks of the other unit. The plate 21 has disposed therebeneath a disk shaft 26 which is journalled in a pair of bearings 27 which are carried by depending hangers 28 which are fixed at their upper ends to the lower side of the plate 21. The shaft 26 has fixed thereon a plurality of disks 29 which are adapted to engage the earth so that the earth may be either loosened when the disks are in axial alignment or the earth may be shifted either inwardly toward the center of the frame or toward the opposite or outer ends of the frame.

The frame 10 has fixed in the longitudinal center thereof a lengthwise extending tubular member 30 which forms a supporting means for a vertically adjustable caster wheel. The rear of the tubular member 30 has fixed thereto a vertically disposed tubular or sleeve like bearing 31 within which a vertically disposed shaft 32 is loosely mounted. The shaft 32 is adapted to be adjusted endwise in the bearing sleeve 31 and may also rotate in this sleeve. The lower end of the shaft 32 has fixed thereto a fork 33 between the arms of which a caster wheel 34 is rotatably mounted. An elongated vertically disposed rack 35 is disposed on the forward side of the bearing sleeve 31 and is provided at its lower end with a right-angularly disposed and rearwardly extending bearing 36 through which the shaft 32 is loosely mounted. The shaft 32 has fixed thereon upper and lower collars 37 and 38 bearing against the opposite ends of the bearing 36 so that the shaft 32 will be vertically adjusted when the rack 35 is vertically adjusted.

The tubular member 30 has mounted thereabove a pair of parallel angle members 39 which are carried by upright supporting bars 40 fixed at their lower ends to the tubular member 30. The angle members 39 are secured together by means of a pair of securing members 41 and spacer sleeves 42 are interposed between the angle members 39 and engage about the securing members 41. The rearmost one of the spacer members, designated 42a, forms a roller against which the rear side of the rack 35 is adapted to movably engage. A gear 43 is disposed between the angle members 39 being secured to a shaft 44 and a rack adjusting wheel 45 is fixed to one end of the shaft 44. The wheel 45 is adapted to be locked against rotation by means of a locking bolt 46 which slidably engages through the angle members 39 and is movable between a pair of the spokes 47 of the wheel 45 so that the wheel 45 will be firmly locked against rotation.

In the use and operation of this device, the forward end of the frame 10 is adapted to be connected to the rear of a tractor vehicle and the forward end may be vertically adjusted relative to the tractor vehicle by disposing the horizontal coupling bar 16 in selected pairs of the vertically spaced openings 17 in the vertical angle members 15. The disk units 20 may be angularly adjusted relative to each other by removing the bolt 25 and swinging the plate 21 of each unit with the bolt 22 as a pivot. The disk units may be adjusted to dispose the disk shafts 26 thereof in either alignment with each other, in forwardly convergent relation or in rearwardly convergent relation. The angular positions of the disk shafts 26 relative to each other will determine the movement of the earth which is engaged by the disks 29. The frame 10 with the disks 29 may be vertically adjusted at the rear thereof by rotating the adjusting wheel 45 so as to raise or lower the rack 35 and to raise or lower therewith the bearing sleeve 31.

This device will provide a multi-unit disk construction which may have varied uses by the user, the use as a ditch filler being only one of the many uses for the device.

I claim:

An earthworking machine comprising a horizontally disposed frame including a transversely extending plate adjacent the rear end thereof, a plurality of transversely spaced apart openings formed in said plate along the rear edge and adjacent each of the opposite ends thereof, a plurality of openings formed along the forward edge of said plate adjacent the opposite ends thereof and spaced the same distance apart as said first mentioned openings, a swingable plate disposed below each end of said transversely extending plate, pivot means extending through selected ones of said first openings and said swingable plates for mounting the latter upon said frame, each of said swingable plates being provided with a plurality of spaced arcuately arranged openings therethrough disposed equi-distant from said pivot means, locking means engaging through said selected ones of said openings formed along the forward edge of said transverse plate and said arcuately arranged openings for maintaining said swingable plates in selected angular disposition relative to said frame, a shaft journalled below each of said swingable plates, and a plurality of disc members disposed on each of said shafts whereby said disc members may be adjusted outwardly, inwardly, and angularly relative to said frame.

ALVIN L. MEYER.

REFERENCES CITED

The following references are of record in the file of this patent:

UNITED STATES PATENTS

| Number | Name | Date |
|---|---|---|
| 214,440 | Payne | Apr. 15, 1879 |
| 471,209 | Cordes | Mar. 22, 1892 |
| 724,650 | Zobel | Apr. 7, 1903 |
| 872,957 | Mohr et al. | Dec. 3, 1907 |
| 941,127 | Braun | Nov. 23, 1909 |
| 1,013,382 | East | Jan. 2, 1912 |
| 1,620,697 | Spence | Mar. 15, 1927 |
| 1,786,863 | Peterson | Dec. 30, 1930 |
| 2,101,187 | Olson | Dec. 7, 1937 |
| 2,152,347 | Ferraro | Mar. 28, 1939 |
| 2,286,305 | Priestly | June 16, 1942 |